(12) United States Patent
Sakurai et al.

(10) Patent No.: US 8,031,274 B2
(45) Date of Patent: Oct. 4, 2011

(54) TOUCH PANEL, ELECTRO-OPTIC DEVICE, MANUFACTURING METHOD FOR ELECTRO-OPTIC DEVICE AND ELECTRONIC DEVICE

(75) Inventors: Shinji Sakurai, Matsumoto (JP); Satoshi Taguchi, Tottori (JP); Tsukasa Funasaka, Shiojiri (JP)

(73) Assignee: Seiko Epson Corporation (JP)

( * ) Notice: Subject to any disclaimer, the term of this patent is extended or adjusted under 35 U.S.C. 154(b) by 796 days.

(21) Appl. No.: 11/657,686

(22) Filed: Jan. 24, 2007

(65) Prior Publication Data

US 2007/0171212 A1    Jul. 26, 2007

(30) Foreign Application Priority Data

Jan. 26, 2006   (JP) ................. 2006-017331

(51) Int. Cl.
  *G02F 1/1335* (2006.01)
  *G06F 3/043* (2006.01)
(52) U.S. Cl. .......... 349/12; 345/177; 178/18.04
(58) Field of Classification Search .......... 349/12; 345/177; 178/18.04
  See application file for complete search history.

(56) References Cited

U.S. PATENT DOCUMENTS

| | | | |
|---|---|---|---|
| 6,369,865 B2 * | 4/2002 | Hinata ...................... | 349/12 |
| 6,771,327 B2 | 8/2004 | Sekiguchi | |
| 6,791,640 B1 | 9/2004 | Okamoto et al. | |
| 6,922,220 B2 | 7/2005 | Okamoto et al. | |
| 6,958,794 B2 | 10/2005 | Okamoto et al. | |
| 7,023,510 B2 | 4/2006 | Okamoto et al. | |
| 7,092,052 B2 | 8/2006 | Okamoto et al. | |
| 7,190,416 B2 * | 3/2007 | Paukshto et al. .......... | 349/12 |
| 7,545,343 B2 | 6/2009 | Ogino et al. | |
| 2004/0239647 A1 | 12/2004 | Endo | |
| 2004/0265602 A1 * | 12/2004 | Kobayashi et al. ........ | 428/458 |
| 2005/0280635 A1 * | 12/2005 | Hinata ...................... | 345/173 |

FOREIGN PATENT DOCUMENTS

| | | |
|---|---|---|
| CN | 1260883 | 7/2000 |
| JP | 04-0074212 | 3/1992 |
| JP | 3010669 | 12/1999 |
| JP | 2002-277856 | 9/2002 |
| JP | 2004-309922 | 11/2004 |
| JP | 2004-348686 | 12/2004 |
| JP | 2005-071286 | 3/2005 |
| JP | 2005-242315 | 9/2005 |
| JP | 2005-345799 | 12/2005 |

* cited by examiner

*Primary Examiner* — Michael H Caley
(74) *Attorney, Agent, or Firm* — Harness, Dickey & Pierce, P.L.C.

(57) ABSTRACT

A touch panel includes: a first touch panel substrate having a first surface and having a flexibility; a second touch panel substrate arranged a fixed distance away from the first touch panel substrate via spacers, having a second surface that faces the first surface; a position detecting section formed on the first surface, and detecting a position where the first touch panel substrate is being pressed based on changes in surface acoustic waves generated on the first surface; and a resin film formed on the second surface.

8 Claims, 6 Drawing Sheets

TOUCH PANEL, ELECTRO-OPTIC DEVICE, MANUFACTURING METHOD FOR ELECTRO-OPTIC DEVICE AND ELECTRONIC DEVICE

CROSS-REFERENCE TO RELATED APPLICATION

This application claims priority from Japanese Patent Application No. 2006-017331, filed Jan. 26, 2006, the contents of which are incorporated herein by reference.

BACKGROUND

1. Technical Field

The present invention relates to a touch panel, an electro-optic device, a manufacturing method for an electro-optic device and an electronic device.

2. Related Art

In recent years, in conjunction with the increasing use of small information electronic devices such as personal digital assistants (PDA) and palm top computers, liquid crystal display devices that have a touch panel mounted as an input device on a liquid crystal panel have become widely used.

An example of this type of touch panel is an ultrasonic surface acoustic wave system includes: a glass substrate, a transmitter that transmits a surface acoustic wave over a surface of the glass substrate, and a receiver that detects transmitted surface acoustic waves.

When a user touches a surface of the glass substrate with a finger or the like, the surface acoustic waves that are being transmitted over the surface of the glass substrate become attenuated at the touched position.

In an ultrasonic surface acoustic wave type of touch panel, it is possible to detect a position touched by a user using this property of surface acoustic waves to become attenuated at a touched position.

However, in a typical ultrasonic surface acoustic wave type of touch panel, because surface acoustic waves are generated on the topmost surface, the surface acoustic waves also become attenuated if water droplets or oil droplets, or dirt or the like are adhering to this topmost surface.

Because of this, an ultrasonic surface acoustic wave type of touch panel erroneously detects locations where water or oil droplets or dirt have adhered as positions touched by a user's finger or the like.

In a touch panel device disclosed in Japanese Unexamined Patent Application, First Publication No. 2004-348686, because the touch panel is formed by a single glass substrate, it has poor impact resistance and when the glass has been formed as a particularly thin plate, there is a problem in that it is broken by only a slight impact.

Therefore, a touch panel has been proposed in which a transparent resin film or the like is arranged on the topmost surface of the glass substrate that is transmitting the surface acoustic waves.

For example, in Japanese Unexamined Patent Application, First Publication No. 2004-348686, a touch panel is disclosed that includes: a glass substrate over which a surface acoustic wave is transmitted; a transducer that sends and receives surface acoustic waves and is arranged facing circumferential edge portions of this glass substrate so as to form a pair; a detecting section that, based on surface acoustic waves that are sent and received by the transducer, detects a touch position of an object that is touching a predetermined operating area; and a transparent resin film that is arranged so as to sandwich a space layer between itself and the glass substrate, and that has a plurality of dot spacers formed on a surface thereof that faces the glass substrate.

In addition to a transparent resin film, a transparent glass substrate or the like is also used to protect the topmost surface of a substrate over which surface acoustic waves are transmitted.

By employing this type of touch panel structure, because the transparent substrate over which surface acoustic waves are transmitted is not exposed but is covered by a transparent resin film, it is possible to prevent any malfunctions that are caused by scratches or dirt or other contamination, and it is also possible to prevent glass substrate shards from flying should the glass substrate be broken.

In the above described patent document, the outer surface of the transparent resin film forms an input surface that is pressed by a user, and when an input is made a predetermined position of an outer surface of the transparent resin film is pressed so as to bend the transparent film.

The bending portion of the transparent resin film makes contact with the glass substrate surface and causes the surface acoustic waves being transmitted over the glass substrate surface to become attenuated.

The transducer detects a position pressed by a user based on the attenuation factor of these surface acoustic waves.

However, in a transparent resin film (glass substrate), because there is a high modulus of elasticity (Young's modulus), the resin film is not sufficiently bent by the pressing of the user and it is not possible to attenuate the surface acoustic waves being transmitted over the glass substrate surface.

As a result, there is a problem in that it has not been possible to detect the precise position pressed by a user and input malfunctions occur.

SUMMARY

An advantage of some aspects of the invention is to provide a touch panel, an electro-optic device, a manufacturing method for an electro-optic device and an electronic device, in which it is possible to accurately detect a position pressed by a user, and prevent input malfunctioning.

A first aspect of the invention provides a touch panel including: a first touch panel substrate having a first surface and having a flexibility; a second touch panel substrate arranged a fixed distance away from the first touch panel substrate via spacers, having a second surface that faces the first surface; a position detecting section formed on the first surface, and detecting a position where the first touch panel substrate is being pressed based on changes in surface acoustic waves generated on the first surface; and a resin film formed on the second surface.

The touch panel according to this invention is known as an ultrasonic wave type of touch panel.

The touch panel generates surface acoustic waves on a substrate using sound waves such as ultrasonic waves or the like, using a detecting section, detects a position pressed by an inputting object based on changes in the surface acoustic waves.

Here, 'surface acoustic waves' refers to waves that are transmitted along a boundary between two different media without releasing any energy.

In this invention, surface acoustic waves are transmitted along the first surface of a first touch panel substrate.

A finger, a touch pen, or the like of an operator making an input can be considered as the aforementioned inputting object.

In the structure of this invention, an outer surface side (an opposite surface of the first surface) of a flexible first touch panel substrate forms an input surface pressed by a user.

The first touch panel substrate is bent in the direction of the second touch panel substrate as a result of the input surface of the first touch panel substrate being pressed, and the bent portion of the first touch panel substrate comes into contact with a resin film formed on the second touch panel substrate.

At this time, because stress that is generated by the pressing in the direction of the second touch panel substrate is absorbed by the resin film which has a low modulus of elasticity, the resin film that is in contact with the bent portion of the first touch panel substrate bends as a consequence of this contact so that the surface area of the resin film that is located at the contact portion between the first touch panel substrate and the resin film is enlarged.

Accordingly, the surface acoustic waves transmitted over the first surface of the first touch panel substrate are blocked by the contact portion between the first touch panel substrate and the resin film and are sufficiently changed (attenuated) in this contact portion.

As a result, it is possible for the position detecting section to detect a pressed position with a high degree of accuracy based on a position where the surface acoustic waves change.

Moreover, the surface acoustic waves of this invention are generated in the first surface (between the first touch panel substrate and the second touch panel substrate) of the first touch panel substrate and are transmitted through this first surface.

Accordingly, because the first surface of the first touch panel substrate on which the surface acoustic waves are transmitted is not exposed to the outside, it is possible to prevent foreign matter or dirt adhering to the first surface.

Consequently, because the surface acoustic waves do not change as a result of foreign matter or dirt adhering to the surface of the first touch panel substrate where the surface acoustic waves are formed, malfunctioning of the touch panel can be prevented.

In this application, 'electro-optic device' refers not only to devices having the electro-optic effect of changing a transmittance of light by changing the refractive index of a substance using an electric field, but also to devices that convert electrical energy into optical energy.

Specifically, such devices include liquid crystal display devices that use liquid crystals as an electro-optic substance, organic electroluminescence (EL) devices that use organic EL as an electro-optic substance, inorganic EL devices that use inorganic EL, and plasma display devices that use plasma gas as an electro-optic substance.

Further such devices include electrophoretic (EPD) display devices, field emission display (FED) devices, and electrochronic display (ECD) devices.

It is preferable that, in the touch panel of the first aspect of the invention, the Young's modulus of the resin film be less than or equal to 4 GPa.

The position detecting section detects a position where the surface acoustic waves have changed as a position where the touch panel has been pressed.

Here, 'changes in the surface acoustic waves' refers to attenuation factor in the surface acoustic waves being transmitted on a substrate surface. The position detecting section detects surface acoustic waves being transmitted in a predetermined direction on a substrate surface and, based on an attenuation factor of the detected surface acoustic waves, calculates the position where the touch panel is pressed.

However, because surface acoustic waves are generally from several MHz to several 10s of MHz and the detected voltage is also extremely small, there are cases when surface acoustic waves change in a position not being pressed due to the effects of electromagnetic noise generated, for example, by other portions of the product.

This becomes noise and generates malfunctioning in the touch panel.

Here, a threshold value for an attenuation factor of surface acoustic waves that is caused by noise is generally approximately 5%. If this attenuation factor is converted into a Young's modulus it is generally greater than 4 GPa.

According to the structure of this invention, because the Young's modulus of the resin film is less than or equal to 4 GPa, the attenuation factor of surface acoustic waves that is caused by pressing is greater than 5%.

Accordingly, the threshold value for the attenuation factor of surface acoustic waves that caused by pressing is greater than the attenuation factor of surface acoustic waves that is caused by noise, and it is possible to reliably discriminate between an attenuation factor of surface acoustic waves that caused by pressing and an attenuation factor of surface acoustic waves that is caused by noise.

Consequently, it is possible to prevent malfunctioning of a touch panel.

It is preferable that, in the touch panel of the first aspect of the invention, the material of the resin film be polyethylene.

The modulus of elasticity of polyethylene is generally 0.6 GPa. If this is converted into an attenuation factor, it is greater than 20%.

As a result, the surface acoustic wave attenuation factor of polyethylene is greater than the surface acoustic wave attenuation factor that is caused by noise, and it becomes possible to reliably discriminate between an attenuation factor of surface acoustic waves that caused by pressing and an attenuation factor of surface acoustic waves that is caused by noise.

A second aspect of the invention provides an electro-optic device including an electro-optic panel and a touch panel. In this electro-optic device, the electro-optic panel includes: a first electro-optic panel substrate; a second electro-optic panel substrate arranged so as to face to the first electro-optic panel substrate; and an electro-optic substance sandwiched between the first electro-optic panel substrate and the second electro-optic panel substrate, and the touch panel includes: a second touch panel substrate arranged on an opposite surface of the first electro-optic panel substrate with respect to the electro-optic substance, and having a second surface; a first touch panel substrate arranged a fixed distance away from the second touch panel substrate via spacers, having a first surface that faces the second surface and having a flexibility; a position detecting section formed on the first surface, and detecting a position where the first touch panel substrate is being pressed based on changes in surface acoustic waves generated on the first surface; and a resin film formed on the second surface.

According to this structure, the first touch panel substrate is bent in the direction of the second touch panel substrate as a result of the input surface of the first touch panel substrate of the touch panel being pressed, and the bent portion of the first touch panel substrate comes into contact with the resin film provided on the second touch panel substrate.

At this time, because stress that is generated by the pressing in the direction of the second touch panel substrate is absorbed by the resin film which has a low modulus of elasticity, the resin film that is in contact with the bent portion of the first touch panel substrate bends as a consequence of this contact so that the surface area of the resin film that is located at the contact portion between the first touch panel substrate and the resin film is enlarged.

Accordingly, the surface acoustic waves transmitted over the first surface of the first touch panel substrate are blocked by the contact portion between the first touch panel substrate and the resin film and are sufficiently changed (attenuated) in this contact portion.

As a result, it is possible for the position detecting section to detect a pressed position with a high degree of accuracy based on a position where the surface acoustic waves change.

Moreover, the surface acoustic waves of this invention are generated in the first surface (between the first touch panel substrate and the second touch panel substrate) of the first touch panel substrate and are transmitted through this first surface.

Accordingly, because the first surface of the first touch panel substrate through which the surface acoustic waves are transmitted is not exposed to the outside, it is possible to prevent foreign matter or dirt adhering to the first surface.

Consequently, because the surface acoustic waves do not change as a result of foreign matter or dirt adhering to the surface of the first touch panel substrate where the surface acoustic waves are formed, malfunctioning of the touch panel can be prevented.

It is preferable that the electro-optic device further include: a first polarization plate arranged on an opposite surface with respect to the first surface; and a second polarization plate arranged on an opposite surface of the second electro-optic panel substrate with respect to the electro-optic substance. In this electro-optic device, the electro-optic panel is a liquid crystal panel, and the electro-optic substance is a liquid crystal layer.

According to this structure, because the first polarization plate is arranged on an outer surface of the first touch panel substrate, even if the first panel substrate is broken by the impact from pressing or the like, the shards of the broken first touch panel substrate can be prevented from flying outwards.

It is preferable that, in the electro-optic device, the Young's modulus of the resin film be less than the Young's modulus of the first touch panel substrate and the first polarization plate.

According to this structure, because the Young's modulus of the resin film is less than the Young's modulus of the first touch panel substrate and the first polarization plate, the contact surface area between the first touch panel substrate and the resin film increases, and the surface acoustic waves can be sufficiently attenuated.

A third aspect of the invention provides an electro-optic device including an electro-optic panel and a touch panel. In this electro-optic device, the electro-optic panel includes: a first electro-optic panel substrate, having a second surface; a second electro-optic panel substrate arranged so as to face to the first electro-optic panel substrate; and an electro-optic substance sandwiched between the first electro-optic panel substrate and the second electro-optic panel substrate, and the touch panel includes: a touch panel substrate arranged a fixed distance away from the first electro-optic panel substrate via spacers, and having a first surface that faces the second surface and having a flexibility; a position detecting section formed on the first surface, and detecting a position where the touch panel substrate is being pressed based on changes in surface acoustic waves generated on the first surface; and a resin film formed on the second surface.

According to this structure, because the touch panel is constructed from a single touch panel substrate, compared with when a touch panel is constructed from a pair of touch panel substrates, it is possible to reduce the thickness of the touch panel which enables the thickness of the electro-optic device to be made thinner.

Moreover, using the structure it is also possible to achieve the same operating effects as in the above described electro-optic device.

It is preferable that the electro-optic device further include: a first polarization plate arranged on an opposite surface with respect to the first surface; and a second polarization plate arranged on an opposite surface of the second electro-optic panel substrate with respect to the electro-optic substance. In this electro-optic device, the electro-optic panel is a liquid crystal panel, and the electro-optic substance is a liquid crystal layer.

According to this structure, because the first polarization plate is arranged on an outer surface of the first touch panel substrate, even if the first panel substrate is broken by the impact from pressing or the like, the shards of the broken first touch panel substrate can be prevented from flying outwards.

It is preferable that, in the electro-optic device, the Young's modulus of the resin film be less than the Young's modulus of the first touch panel substrate and the first polarization plate.

According to this structure, because the Young's modulus of the resin film is less than the Young's modulus of the touch panel substrate and the first polarization plate, the contact surface area between the touch panel substrate and the resin film increases, and the surface acoustic waves can be sufficiently attenuated.

A fourth aspect of the invention provides an electronic device including the above described electro-optic device.

According to the electronic device of this invention, because an electro-optic device is formed in which malfunctioning is prevented and flying touch panel shards are prevented, it is possible to provide a high performance and highly reliable electronic device.

A fifth aspect of the invention provides an manufacturing method for an electro-optic device including: preparing a pair of substrates; affixing the substrates so as to sandwich an electro-optic substance therebetween, thereby forming an electro-optic substance substrate body including a plurality of electro-optic panels; coating one surface of the electro-optic substance substrate body with a resin film material using a liquid phase method, and drying the resin film material, thereby forming a resin film; after the forming of the resin film, dividing the electro-optic substance substrate body so as to obtain the individualized electro-optic panels, each of which has the resin film; and arranging a touch panel via the spacers on the resin film of the on the electro-optic panel.

In this method, because the resin film is formed using a liquid phase method, it is possible to form the resin film over the entire surface of the electro-optic panel while controlling the film thickness thereof.

A resin film that is formed using this method has a small optical modulus of elasticity and is optically isotropic.

As a result, even if an electro-optic panel and a touch panel are formed as a single unit, there is no loss of the light that is emitted from a backlight and this light can be made visible to an observer on the touch panel side.

DESCRIPTION OF EXEMPLARY EMBODIMENTS

Embodiments of this invention will be described with reference made to the drawings.

First Embodiment

Liquid Crystal Display Device

Firstly, a liquid crystal display device 100 including a touch panel according to a first embodiment of this invention will be described.

Figure 1:
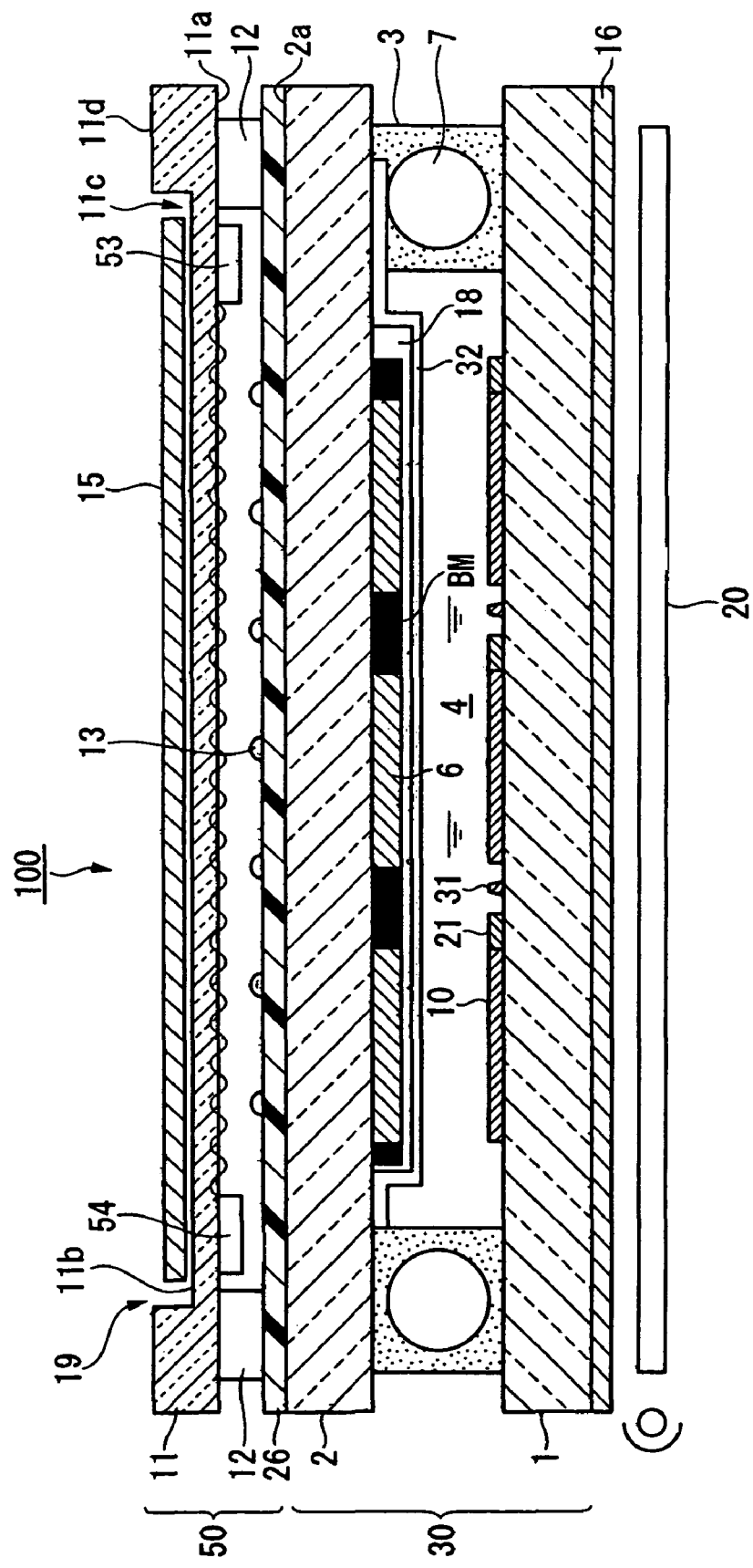
FIG. 1 is a cross-sectional view showing a schematic structure of a liquid crystal display device including a touch panel according to a first embodiment.

FIG. 1 is a cross-sectional view showing in typical form a schematic structure of the liquid crystal display device 100 including a touch panel according to the first embodiment.

In the embodiments described below, this invention is applied to a liquid crystal display device.

In FIG. 1, the liquid crystal display device 100 (an electro-optic device) is broadly separated into a liquid crystal display panel 30 (an electro-optic panel) and a touch panel 50.

Firstly, the structure of the liquid crystal display panel will be described with reference made to FIG. 1.

Surfaces of an element substrate 1 and a color filter substrate 2 that is closer to the liquid crystal layer is called an inner side, while a surface on the opposite side from the liquid crystal layer is called an outer side.

In the liquid crystal panel 30, the color filter substrate 2 (a first electro-optic panel substrate) and the element substrate 1 (a second electro-optic panel substrate) that is positioned facing the color filter substrate 2 are adhered together via a frame-shaped sealing component 3.

A liquid crystal layer 4 (an electro-optic substance) is formed by filling an area between the color filter substrate 2 and the element substrate 1 with liquid crystal.

Conductive components 7 such as a plurality of metal particles are mixed in the frame-shaped sealing member 3.

The color filter substrate 2 is formed by a glass substrate or the like and a coloring layer 6 of either red (R), green (G), or blue (B) is formed on an inner surface of the color filter substrate 2.

Color filters are formed by the coloring layers 6.

A black shading layer BM is formed between adjacent coloring layers 6 in order to shade light.

A protective layer 18 that is formed from transparent resin or the like is formed on top of the coloring layers 6 and the black shading layer BM.

This protective layer 18 has the function of smoothing any differences in height between the color filters of each color, and also has the function of protecting the coloring layers 6 from corrosion or contamination that is caused by chemicals or the like that are used in a process to manufacture the liquid crystal display device 100.

A transparent electrode 32 is formed in a stripe configuration from indium tin oxide (ITO) or the like on a surface of the protective layer 18.

One end of this transparent electrode 32 extends to an interior of the sealing component 3 and is electrically connected to the conductive components 7 inside the sealing component 3.

The element substrate 1 is formed from glass or the like, and scan lines 31 are formed at fixed intervals on an inner surface of the element substrate 1.

Moreover, TFD elements 21 that are formed by switching elements, and pixel electrodes 10 are formed for each sub-pixel on an inner surface of the element substrate 1.

In addition, the scan lines 31 are electrically connected via the TFD element 21 corresponding to the scan lines 31 with the pixel electrodes 10.

In the liquid crystal display panel 30, by applying voltage between the pixel electrode 10 and the transparent electrode 32, and performing orientational control of the liquid crystals of the liquid crystal layer 4, the light transmittance is changed so as to make a gradational display.

Here, the switching element is not limited to a thin film diode (TFD) element, and a thin film transistor (TFT) can be used as the switching element.

An illumination device 20 that functions as a backlight is arranged on an outer surface (the opposite surface in respect of the liquid crystal layer 4) of the element substrate 1.

The illumination device 20 has a light source, specifically, a point light source in the form of a light emitting diode (LED), and a light conductor that converts the point light emitted from the LED into surface light and emits this surface light.

Light emitted from each LED is introduced into the light conductor and is then radiated from the light emitting surface of the light conductor in the direction of the liquid crystal display panel 30 as surface light.

Next, the structure of the touch panel 50 will be described with reference made to FIG. 1.

The touch panel 50 is an ultrasonic surface acoustic wave type of touch panel and has a thin substrate 11, a resin film 26, a transmitter 51 and 54, and a receiver 52 and 53 (position detecting section).

The resin film 26 is formed over an entire outer surface 2a (second surface) of the color filter substrate 2 of the liquid crystal display panel 30.

For example, polyethylene is used for the material of the resin film 26, and the Young's modulus (modulus of elasticity) of this resin film 26 is 0.6 GPa.

The thickness of the resin membrane 26 is preferably approximately 0.02 mm to 0.5 mm.

The material of the resin film 26 is not limited to polyethylene, and other materials having that the modulus of elasticity of the resin film 26 is less than or equal to 4 GPa, may be used.

The thin substrate 11 is arranged via the resin film 26 and spacers 12 on the outer surface 2a of the color filter substrate 2 of the liquid crystal display panel 30.

The thin substrate 11 is formed from a transparent material such as, for example, glass and has a coordinate input surface 19 where a user actually makes an input using a finger or the like on an outer surface 11b (an opposite surface of the first surface) thereof.

Namely, the outer surface 11b of the thin substrate 11 is the side where a user observes images and inputs information.

A recessed portion 11c in which portions corresponding to the coordinate input surface 19 have been selectively etched is formed on the outer surface 11b of the thin substrate 11.

In the thin substrate 11, the thickness of the etched recessed portion 11c is made thinner than the thickness of a circumferential edge portion 11d that has not been etched.

As a result, the thinness of the thin substrate 11 gives it sufficient flexibility to be able to make contact with the color filter substrate 2 (the resin film) when pressed by a user.

The spacers 12 are aligned around the circumferential edge portion (a non-display area) on the resin film 26, and the thin substrate 11 and the resin film 26 are adhered together by the spacers 12.

The spacers 12 have a uniform thickness and the thin substrate 11 and the color filter substrate 2 are held constant at a distance from each other.

As a result, it is possible to prevent incorrect operations when a user has not pressed the thin substrate and the occurrence of Newton rings can also be prevented.

The resin film 26 may be formed so as to expose the circumferential edge portions of the color filter substrate 2, and to then arrange the spacers 12 on the exposed color filter substrate 2.

The transmitter 51 and 54 that transmits surface acoustic waves and the receiver 52 and 53 that receives the transmitted surface acoustic waves are provided on the inner surface 11a (the first surface) of the thin substrate 11.

The surface acoustic waves are transmitted over the surface 11a of the thin substrate 11.

A plurality of projections 13 are formed as spacer components at equal intervals on the resin film 26 of the touch panel 50.

Because the thin substrate 11 is flexible, there is concern that the thin substrate 11 may be bent at times other than when it is being pressed by a user's finger or the like.

By forming the projections 13 on the resin film 26, even if the thin substrate 11 becomes bent at times other than when it is being pressed, it is still possible to prevent the thin substrate 11 and the resin film 26 making contact with each other. As a result, the incorrect operation of the touch panel 50 can be prevented.

The projections 13 may also be formed on the inner surface 11a of the thin substrate 11 and may be formed on either surface.

In the liquid crystal display panel 30, a top polarization plate 15 (a first polarization plate) is arranged on the etched recessed portion 11c on the outer surface 11b of the thin substrate 11 of the touch panel 50.

A transparent material such as glass that has a high light transmittance is used for the thin substrate 11 of the touch panel 50.

In addition, light from the illumination device 20 that is transmitted through the liquid crystal display panel 30 is isotropically transmitted through the thin substrate 11 of the touch panel 50.

Because of this, even if this top polarization plate 15 is arranged in the aforementioned position, its function as a polarization plate for the liquid crystal display panel 30 is not lost.

As a result, because the top polarization plate 15 is arranged in the recessed portion 11c of the thin substrate 11, the strength of the thin substrate 11 is increased so that it is more difficult to break, and the shards thereof can be prevented from scattering if the thin substrate 11 does get broken.

Moreover, because the top polarization plate 15 is contained inside the recessed portion 11c of the thin substrate 11, it is possible to reduce the thickness of the liquid crystal display device 100.

In contrast, a bottom polarization plate 16 (a second polarization plate) is arranged on the outer surface side of the element substrate 1 of the liquid crystal display panel 30.

The touch panel 50 is adhered to the liquid crystal display panel 30 by a sealing component that is provided in a frame shape on circumferential edge portions (non-display portions) of the outer surface 2a of the color filter substrate 2 of the liquid crystal display panel 30.

In this manner, in this embodiment, the touch panel 50 and the liquid crystal display panel 30 are formed as a single unit, so that a liquid crystal display device 100 is constructed that has touch panel functions.

Next, the structure of the inner surface 11a of the thin substrate 11 of the touch panel 50 will be described.

Figure 2:
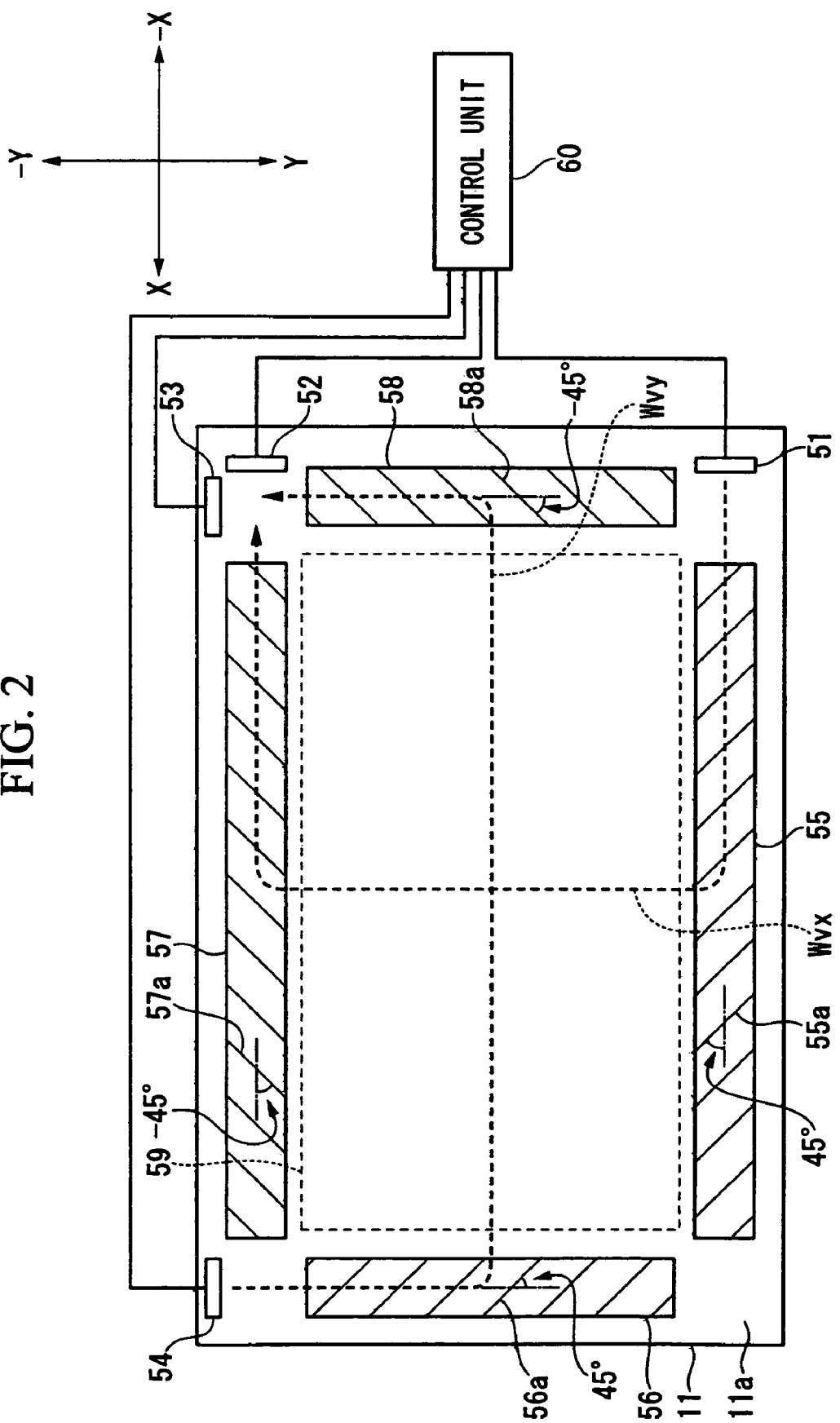
FIG. 2 is a plan view showing a schematic structure of an inner surface side of a thin substrate of a touch panel.

FIG. 2 is a plan view showing the schematic structure of the inner surface 11a of the thin substrate 11 of the touch panel 50.

The touch panel 50 has an input correspondence surface 59 that corresponds to the coordinate input surface 19, which is on the topmost surface, in a center portion of the surface 11a that is formed by the inner surface of the thin substrate 11.

An X transmitter 51 (position detecting section) that generates surface acoustic waves Wvx in the X axial direction shown by the broken line arrows, and a Y transmitter 54 (position detecting section) that generates surface acoustic waves Wvy in the Y axial direction shown by the broken line arrows are arranged in a corner portion of the surface 11a.

These transmitters generate the surface acoustic waves Wvx and Wvy by converting bulk waves generated by piezoelectric vibrators (not shown) into surface acoustic waves running in specific directions, namely, the X axial direction and Y axial direction.

In addition, an X receiver 52 (position detecting section) that detects the surface acoustic waves Wvx generated by the X transmitter 51 and a Y receiver 53 (position detecting section) that detects the surface acoustic waves Wvy generated by the Y transmitter 54 are arranged in another corner portion of the touch input surface 41a.

Accordingly, the X transmitter 51 and the Y transmitter 54 function as a surface acoustic wave transmitting section in this invention, and the X receiver 52 and the Y receiver 53 function as a surface acoustic wave receiving section in this invention.

The X transmitter 51, the Y transmitter 54, the X receiver 52, and the Y receiver 53 are electrically connected to a control unit 60 (position detecting section).

The control unit 60 causes surface acoustic waves Wvx and Wvy to be generated by the X transmitter 51 and the Y transmitter 54 by sending drive signals to the X transmitter 51 and the Y transmitter 54, and a position touched by a user is calculated based on waveforms of reception signals of the surface acoustic waves Wvx and Wvy received by the X receiver 52 and the Y receiver 53.

The, surface acoustic waves Wvx generated by the X transmitter 51 are transmitted in the X axial direction and enter into a reflective array 55.

The reflective array 55 is an array of reflective elements 55a.

The reflective elements have the function of changing the direction in which the surface acoustic waves are transmitted by reflecting the surface acoustic waves.

The respective reflective elements 55a in the reflective array 55 are arranged at an angle of approximately 45° relative to the X axis and change the direction of the surface acoustic waves Wvx into the −Y axial direction.

The surface acoustic waves Wvx that are directed in the −Y axial direction pass unmodified through the input correspondence surface 59 and enter a reflective array 57.

The respective reflective elements 57a in the reflective array 57 are arranged at an angle of approximately −45° relative to the X axis and have the function of changing the direction of the surface acoustic waves Wvx into the −X axial direction.

The surface acoustic waves Wvx that are directed in the –X axial direction by the reflective elements 57a are detected by the X receiver 52.

The surface acoustic waves Wvy that are generated by the Y transmitter 54 are transmitted in the Y axial direction and, enter a reflective array 56.

The respective reflective elements 56a in the reflective array 56 are arranged at an angle of approximately 45° relative to the Y axis and change the direction of the surface acoustic waves Wvy into the –X axial direction.

The surface acoustic waves Wvy that are directed in the –X axial direction pass unmodified through the input correspondence surface 59 and enter a reflective array 58.

The respective reflective elements 58a in the reflective array 58 are arranged at an angle of approximately –45° relative to the Y axis and change the direction of the surface acoustic waves Wvy into the –Y axial direction.

The surface acoustic waves Wvy that are directed in the –Y axial direction are detected by the Y receiver 53.

Next, the resin film 26 of the touch panel 50 of this embodiment will be described in detail.

Figure 3:
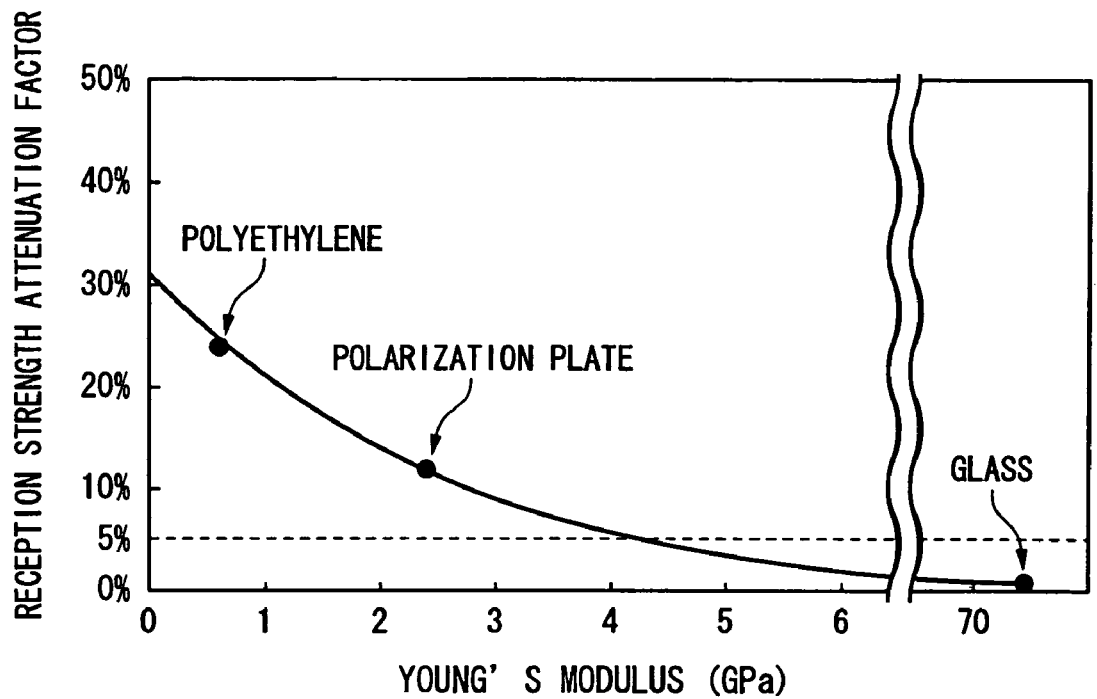
FIG. 3 is a graph showing a relationship between a Young's modulus of a resin film and a resin strength attenuation factor.

FIG. 3 is a graph showing a relationship between a Young's modulus of the resin film 26 and a reception strength attenuation factor.

The horizontal axis of the graph in FIG. 3 shows Young's modulus, while the vertical axis shows a reception strength attenuation factor.

Moreover, in FIG. 3, the Young's modulus of other materials in addition to those used in the resin film 26 are shown when the pressing conditions are the same.

Polyethylene is used for the resin film 26 of this embodiment, and the Young's modulus of this polyethylene is 0.6 GPa as shown in FIG. 3.

The reception strength attenuation factor was more than 20%.

Here, an explanation is given of the reason why the resin film 26 that has a low Young's modulus is provided inside the touch panel 50.

As shown in FIG. 2, the surface acoustic waves transmitted from the X transmitter 51 and the Y transmitter 54 are transmitted along a transmission surface of thin glass and are detected by the X receiver 52 and the Y receiver 53.

At this time, there are cases in which positions that have not been pressed become attenuated due to dirt adhering to the transmission surface of the thin glass, or to the effects of the spacers or the like, or to the effects of electromagnetic waves of a circuit block such as the liquid crystal panel.

As a result, in addition to the position being pressed by the user, the X receiver 52 and the Y receiver 53 detect attenuation in the surface acoustic waves due to the above described effects at a position that is not being pressed.

The attenuation in the surface acoustic waves caused by these affects form noise.

As shown in FIG. 3, the reception strength attenuation factor in the surface acoustic waves caused by this noise is typically less than 5%, and, when calculated as a Young's modulus, is in the vicinity of 4 GPa.

Signals from the noised detected by the X receiver 52 and the Y receiver 53 is superimposed on signals generated by the pressing of the user. The resulting signals are supplied to the control unit 60.

Consequently, in order to discriminate between surface acoustic wave attenuation that is due to noise detected by the X receiver 52 and the Y receiver 53 and surface acoustic wave attenuation that is generated by the pressing of a user, it is necessary for the control unit 60 to make the surface acoustic wave attenuation that is caused by the pressing of the user sufficiently greater than the surface acoustic wave attenuation caused by the noise.

Therefore, in this embodiment, the resin film 26 formed from polyethylene in which the reception strength attenuation factor of the surface acoustic waves that is caused by pressing is greater than or equal to 5%, is provided inside the touch panel 50.

Moreover, a material having a lower Young's modulus than that of the thin substrate 11 and the top polarization plate 15 is used for the material of the resin film 26 of this embodiment.

Here, the thin substrate 11 is formed from glass and, as shown in FIG. 3, the Young's modulus of this thin substrate 11 is from 70 to 77 GPa, while the reception strength attenuation factor thereof is 0.1%.

The top polarization plate 15 is formed, for example, from polyvinyl alcohol (PVOH) film and, as shown in FIG. 3, the Young's modulus of this top polarization plate 15 is 2 GPa, while the reception strength attenuation factor thereof is 15%.

In this manner, when the input portion pressed by a user's finger is the thin substrate 11 or polarization plate 15, because the modulus of elasticity thereof is high, the pressed thin substrate or the like does not bend, and there are cases when it is not possible to sufficiently attenuate the surface acoustic waves.

Therefore, in this embodiment, the resin film 26 formed from polyethylene in which the Young's modulus is 0.6 GPa and the attenuation factor is more than 20% is provided inside the touch panel.

In this manner, the resin film 26 of this embodiment provides a higher reception strength attenuation factor for surface acoustic waves than that caused by noise, while having a lower Young's modulus than those of the thin substrate 11 and the top polarization plate 15.

As a result, it is possible to discriminate between surface acoustic wave attenuation that is caused by the pressing of a user and surface acoustic wave attenuation that is caused by noise.

The material used for the resin film 26 may be appropriately selected provided that it fulfills the above described conditions and is transparent.

Figure 4:
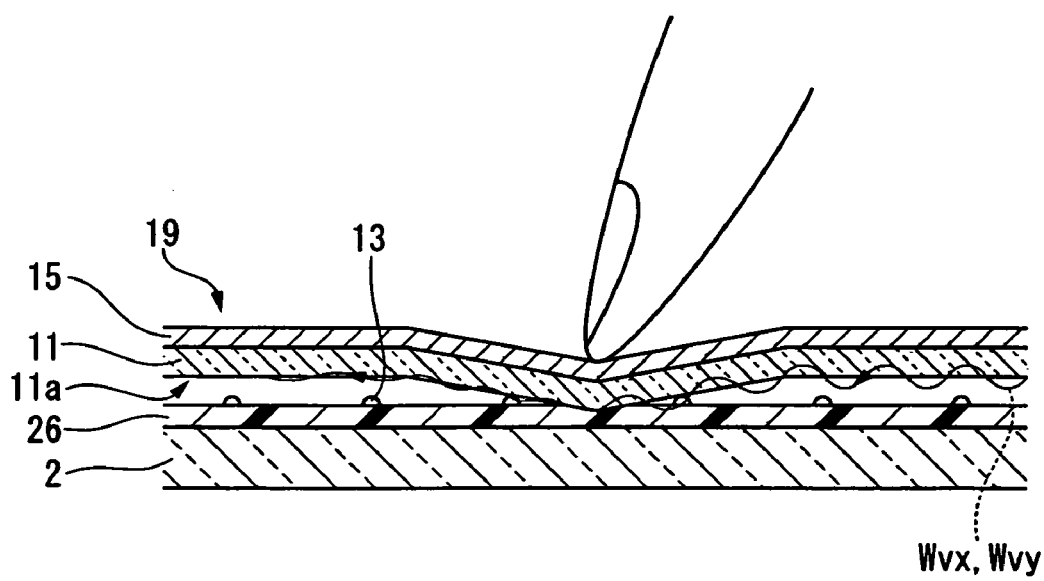
FIG. 4 is a cross-sectional view showing a state when a user presses a touch panel with a finger.

FIG. 4 is a typical view showing a state when a user presses the touch panel 50 with a finger.

When a user presses the coordinate input surface 19 on which the top polarization plate 15 has been arranged using, for example, a finger or the like, the thin substrate 11 at the pressed position bends together with the top polarization plate 15.

As a result, the thin substrate 11 comes into contact with the resin film 26 on top of the color filter substrate 2 of the liquid crystal panel 30.

The surface acoustic waves Wvx and Wvy that are being transmitted over the color filter substrate 2 are absorbed by the contact portion between the resin film 26 and the color filter substrate 2 and the amplitude thereof is attenuated.

The control unit 60 calculates the position pressed by the user by calculating the position where these surface acoustic waves Wvx and Wvy are attenuated.

Figure 5:
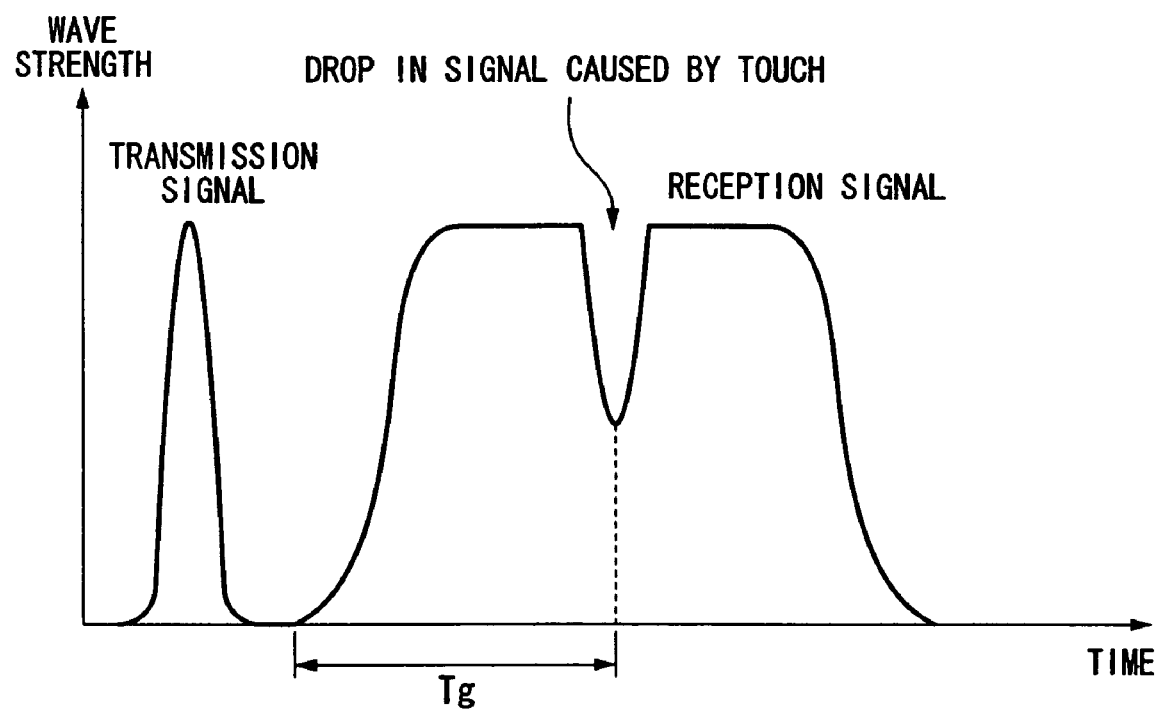
FIG. 5 is a graph showing an example of an envelope waveform of a detected surface acoustic wave.

FIG. 5 is a typical view of a graph showing an example of an envelope curve of a detected surface acoustic wave.

In FIG. 5, the horizontal axis shows time, while the vertical axis shows the intensity of a surface acoustic wave.

A case is described below in which the surface acoustic waves Wvx are sent by the X transmitter 51 as a transmission signal over the surface of the thin substrate 11.

The surface acoustic waves Wvx generated by the X transmitter 51 pass through the reflective arrays 55 and 57 and are detected by the X receiver 52.

At this time, in the respective reflective elements of the reflective arrays 55 and 57, sets of a plurality of paths that each have a different length are made, and the surface acoustic waves Wvx that are reflected by each of the consecutive reflective elements in the reflective arrays 55 and 57 pass through consecutively longer paths and arrive at the X receiver 52.

As a result, as shown in FIG. 5, compared with the waveform of a transmitted signal, the waveform of a reception signal detected by the X receiver is a trapezoidal waveform that maintains a flat shape for a period of time.

When a user has pressed a particular specific location on the coordinate input surface 19, because the amplitude of the surface acoustic waves Wvx passing through that portion is attenuated, a drop in the signal that is caused by the pressing such as that shown in FIG. 5 is generated in the envelope waveform of the surface acoustic wave Wvx.

After the reception signal has been detected, by measuring a time Tg until the drop in the signal is generated by the pressing, it is possible to calculate the attenuation position, which is the position where the surface acoustic wave Wvx is attenuated, and it is possible to specify the X coordinate of the pressed location.

When specifying the Y coordinate of the pressed location as well, because a drop in the signal that is caused by the pressing such as that shown in FIG. 5 is generated in the envelope waveform of the surface acoustic wave Wvy.

In this case as well, after the reception signal has been detected, by measuring a time until the drop in the signal is generated by the pressing, it is possible to calculate the attenuation position, which is the position where the surface acoustic wave Wvy is attenuated, and it is possible to specify the Y coordinate of the pressed location.

Moreover, the control unit 60 has a program that recognizes an attenuation factor value that is higher than a threshold value for the reception strength attenuation factor from noise as being attenuation that is caused by the pressing of a user.

In this manner, the control unit 60 calculates the X coordinate and the Y coordinate of a position pressed by a user based on the surface acoustic wave Wvx detected by the X receiver 52 and the surface acoustic wave Wvy detected by the Y receiver 53.

According to this embodiment, the thin substrate 11 is bent in the direction of the color filter substrate 2 as a result of the input surface of the thin substrate 11 being pressed, and the bent portion of the thin substrate 11 comes into contact with the resin film 26 provided on the color filter substrate 2.

At this time, because stress that is generated by the pressing in the direction of the substrate 2 is absorbed by the resin film 26 which has a low modulus of elasticity.

As a result, the resin film 26 that is in contact with the bent portion of the first touch panel substrate bends as a consequence of this contact so that the surface area of the resin film 26 that is located at the contact portion between the thin substrate 11 and the resin film 26 is enlarged.

Accordingly, the surface acoustic waves transmitted over the inner surface 11a of the thin substrate 11 are blocked by the contact portion between the thin substrate 11 and the resin film 26 and become sufficiently attenuated in this contact portion.

As a result, by the X receiver 52 and Y receiver 53, it is possible to detect a pressed position with a high degree of accuracy based on a position where the surface acoustic waves change.

Moreover, the surface acoustic waves of this embodiment are generated in the inner surface 11a (between the thin substrate 11 and the color filter 2) of the thin substrate 11 and are transmitted through this inner surface 11a.

Accordingly, because the inner surface 11a of the thin substrate 11 through which the surface acoustic waves are transmitted is not exposed to the outside, it is possible to prevent foreign matter or dirt adhering to the inner surface 11a.

Consequently, because the surface acoustic waves do not change as a result of foreign matter or dirt adhering to the surface of the thin substrate 11 where the surface acoustic waves are formed, malfunctioning of the touch panel 50 can be prevented.

Manufacturing Method for Liquid Crystal Display Device

Next, a manufacturing method for the liquid crystal display device 100 and, in particular, a manufacturing method for the resin film 26 will be described.

Firstly, a pair of large glass substrates is prepared. Next, by affixing the (electro-optic substance substrate body) in which a plurality of electro-optic panels is included is formed. In other word, a plurality of liquid crystal display panels 30 is formed between this pair of large glass substrates.

Next, resin film material is coated using a liquid phase method over the entire outer surface (the outer surface of the substrate to which the touch panel 50 is to be adhered) of one substrate of the substrate body which is made of the pair of large glass substrates.

A material obtained by dissolving polyethylene in a solvent is used for this resin film material.

Examples of a liquid phase method include spin coating, spray coating, roll coating, die coating, and dip coating.

Next, solvent in the resin film material coated on the outer surface of the one substrate is evaporated using a heating device such as a heater and the resin film material is dried.

In this manner, a resin film 26 having a film thickness of 0.02 to 0.5 mm is formed over the entire outer surface of the one substrate.

By suitably altering the liquid phase method conditions, it is possible to control the resin film 26 to the desired film thickness.

Next, the substrate body on which the resin film 26 has been formed is divided so as to obtain the individualized electro-optic panels 30, each of which has the resin film.

Finally, the touch panel 50 on which the transmitters 51 and 54, the receivers 52 and 53, or the like have been installed are adhered using an adhesive agent onto the resin film 26 of the color filter substrate 2 of the divided liquid crystal display panel 30.

In this manner, the liquid crystal display device 100 having a touch panel function is formed.

According to this embodiment, because the resin film 26 is formed using a liquid phase method, it is possible to form the resin film 26 over the entire outer surface of one substrate of a pair of large glass substrates (substrate body) while controlling the film thickness thereof.

The resin film 26 that is formed using this method has a small optical modulus of elasticity and is optically isotropic.

As a result, even if the liquid crystal display panel 30 and the touch panel 50 are formed as a single unit, there is no loss of the light that is emitted from an illumination device and this light can be made visible to an observer on the touch panel 50.

Second Embodiment

Next, this embodiment will be described with reference made to the drawings.

In the above described first embodiment, a touch panel was constructed using a pair of thin substrates.

In contrast, this second embodiment differs in that a touch panel is constructed using a pair of touch panel substrates, namely, a first touch panel substrate (thin substrate 11) and a second touch panel substrate.

The rest of the basic structure of the liquid crystal display device is the same as in the first embodiment. Therefore, the same reference numerals are used for common component elements and a detailed structure thereof is omitted.

Figure 6:
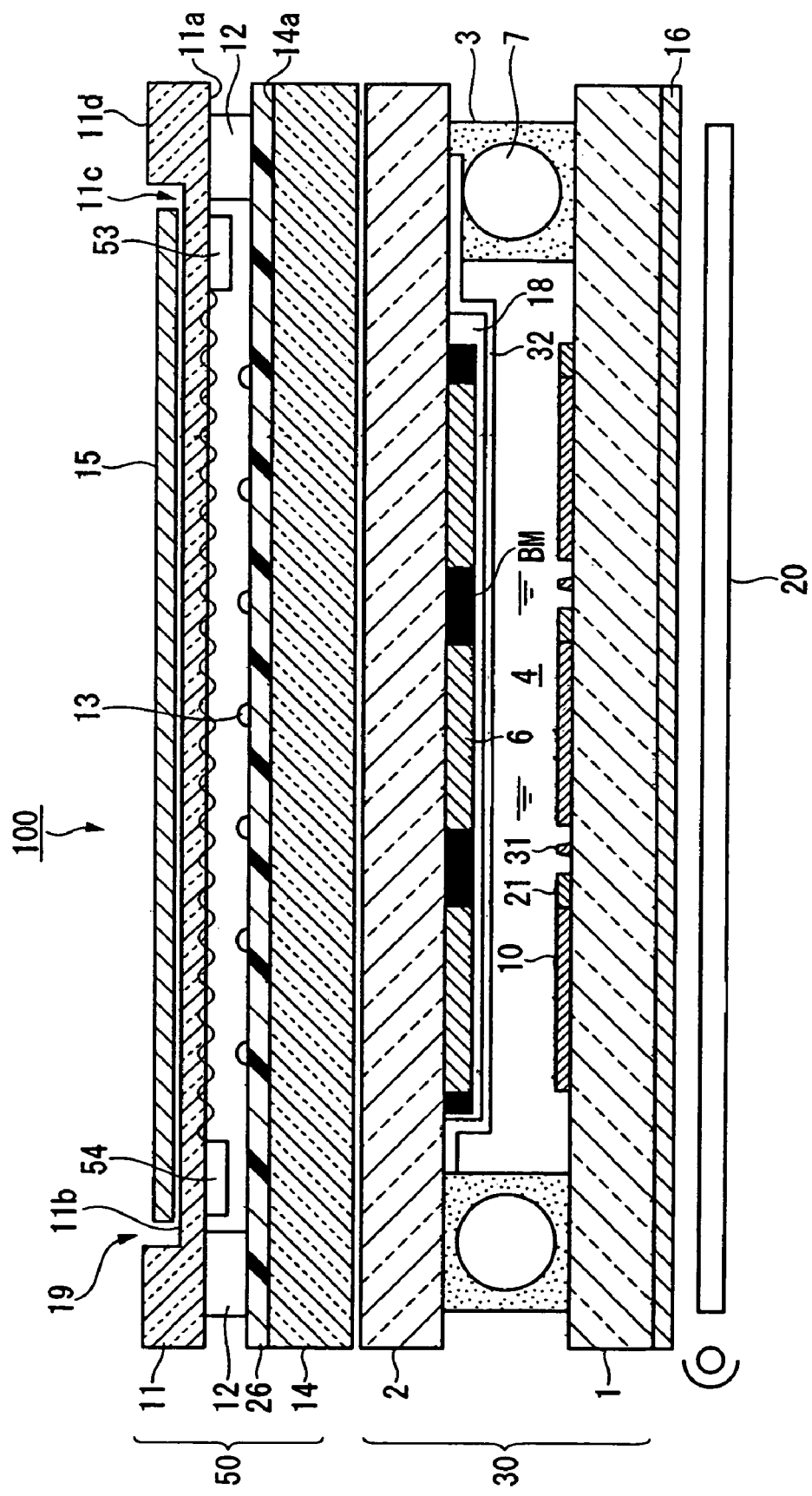
FIG. 6 is a cross-sectional view showing a schematic structure of a liquid crystal display device including a touch panel according to a second embodiment.

FIG. 6 is a cross-sectional view showing the schematic structure of the liquid crystal display device 100 according to this embodiment.

As shown in FIG. 6, a touch panel 50 has a first touch panel substrate 11 that has been made thinner by etching, and a second touch panel substrate 14 that is arranged so as to face the first touch panel substrate 11.

The second touch panel substrate 14 is arranged on an outer surface 14a (second surface) of the color filter substrate 2 of a liquid crystal display panel 30.

In addition, the first touch panel substrate 11 is arranged sandwiching spacers 12 so as to face the second touch panel substrate 14.

A coordinate input surface 19 where a user actually makes an input using a finger or the like is provided on an outer surface 11b (the opposite surface of the first surface) of the first touch panel substrate 11.

A resin film 26 is formed on an inner surface 14a (second surface) of the second touch panel substrate 14.

For example, polyethylene is used for the material of the resin film 26.

As a result, the resin film 26 provides a higher reception strength attenuation factor for surface acoustic waves than that caused by noise, while having a lower Young's modulus than those of the thin substrate 11 and the top polarization plate 15.

A transmitter 51 and 54 that transmits surface acoustic waves and a receiver 52 and 53 that receives the transmitted surface acoustic waves are provided on the inner surface 11a (first surface) of the first touch panel substrate 11.

Accordingly, the surface acoustic waves are transmitted over the inner surface 11a of the first touch panel substrate 11.

According to this embodiment, a touch panel and a liquid crystal display panel are formed in separate processes, and a liquid crystal display device can be formed by subsequently affixing these together.

Because of this, conventional manufacturing device and processes can be used in the unmodified states, and it is possible to achieve a simplification of the manufacturing process as well as a reduction in costs.

Moreover, according to this embodiment, the first touch panel substrate 11 is bent in the direction of the second touch panel substrate 14 as a result of the input surface of the first touch panel substrate 11 of the touch panel 50 being pressed, and the bent portion of the first touch panel substrate 11 comes into contact with the resin film 26 provided on the second touch panel substrate 14.

At this time, because stress that is generated by the pressing in the direction of the substrate is absorbed by the resin film 26 which has a low modulus of elasticity, the resin film 26 that is in contact with the bent portion of the first touch panel substrate 11 bends as a consequence of this contact, so that the surface area of the resin film 26 that is located at the contact portion between the first touch panel substrate 11 and the resin film 26 is enlarged.

Accordingly, the surface acoustic waves transmitted over the inner surface 11a of the first touch panel substrate 11 are blocked by the contact portion between the first touch panel substrate 11 and the resin film 26, and become sufficiently changed (attenuated) in this contact portion.

As a result, it is possible for the position detecting section to detect a pressed position with a high degree of accuracy based on a position where the surface acoustic waves change.

Moreover, the surface acoustic waves of this embodiment are generated in the inner surface 11a (between the first touch panel substrate 11 and the second touch panel substrate 14) of the first touch panel substrate 11 and are transmitted through this inner surface 11a.

Accordingly, because the inner surface 11a of the first touch panel substrate 11 through which the surface acoustic waves are transmitted is not exposed to the outside, it is possible to prevent foreign matter or dirt adhering to the inner surface 11a.

Consequently, because the surface acoustic waves do not change as a result of foreign matter or dirt adhering to the surface of the first touch panel substrate 11 where the surface acoustic waves are formed, malfunctioning of an electro-optic device (the liquid crystal display device 100) can be prevented.

Electronic Device

Next, an example of an electronic device of this invention will be described.

Figure 7:
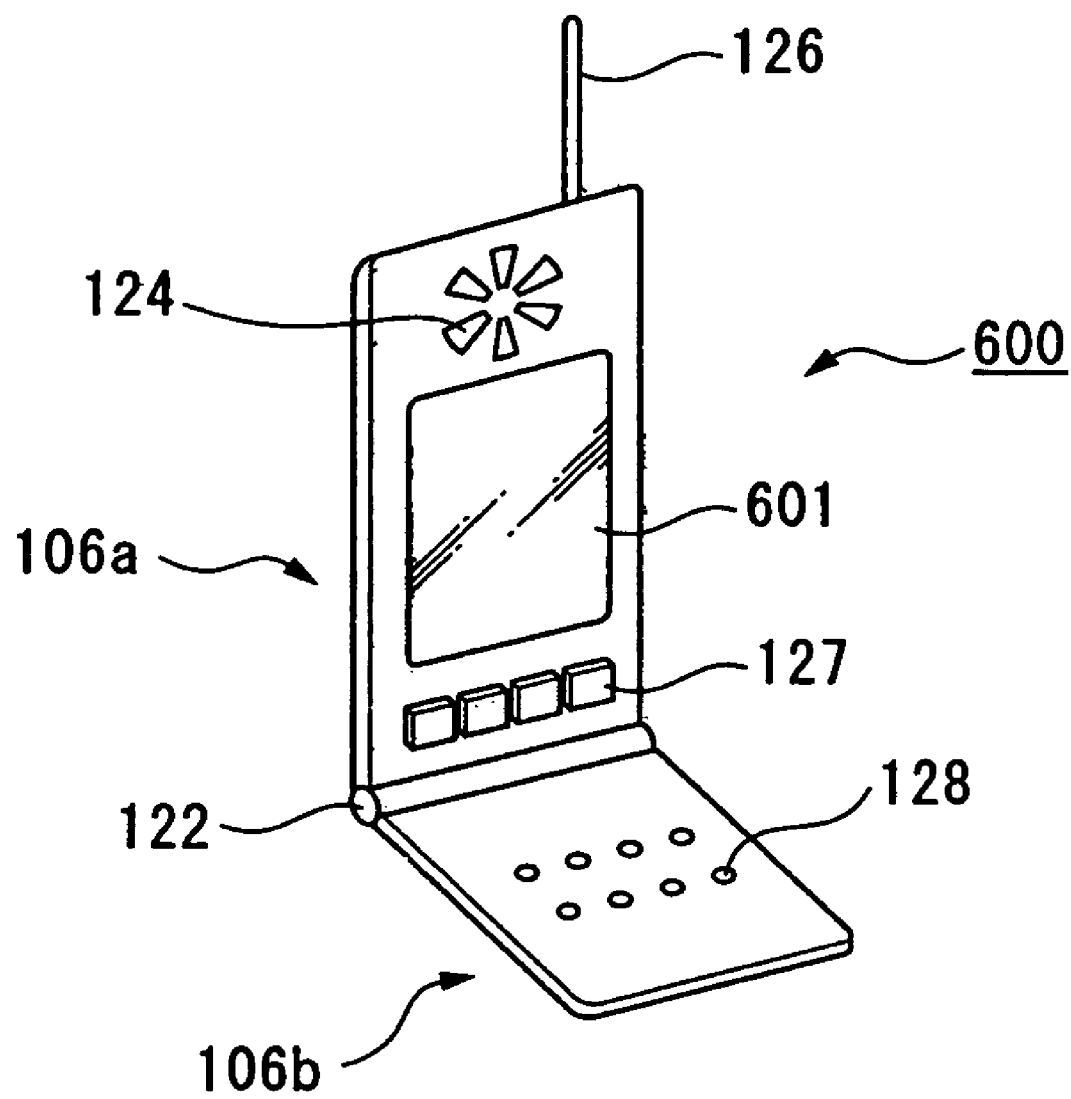
FIG. 7 is a perspective view showing a schematic structure of a mobile telephone.

FIG. 7 is a perspective view showing a mobile telephone (an electronic device) that is provided with the above described liquid crystal display device 100 having the functions of a touch panel.

As shown in FIG. 7, a mobile telephone 600 includes a first body 106a and a second body 106b that are able to be folded around a hinge 122.

In addition, a liquid crystal device 601, a plurality of operating buttons 127, a listening piece 124, and an antenna 126 are provided in the first body 106a.

A microphone 128 is also provided in the second body 106b.

According to the electronic device of this embodiment, because the liquid crystal display device 100 is provided in which malfunctioning is prevented and, in case of an accident, flying shards of touch panel glass (the touch panel substrate and the first touch panel substrate) are prevented, it is possible, to provide a high performance and highly reliable mobile telephone 600.

The above described liquid crystal display device 100 having the functions of a touch panel can be applied to a variety of electronic devices in addition to the above described mobile telephone.

For example, the above described electro-optic device can be applied to electronic devices such as liquid crystal projectors, personal computers (PC) and engineering work stations (EWS) for multimedia applications, pagers, word processors, televisions, viewfinder type or monitor direct view type video tape recorders, electronic notebooks, electronic desktop calculators, car navigation systems, POS terminals, and devices that are provided with touch panels.

That the technical scope of this invention is not limited to the above described embodiments and various modifications can be applied to the above described embodiments insofar as they do not depart from the spirit or scope of this invention.

For example, the touch panel 50 according to the first embodiment and the touch panel 50 according to the second embodiment are not only able to be mounted on the above described liquid crystal display device, but they may also be mounted on other display devices such as organic electroluminescence (EL) devices or the like.

What is claimed is:

1. An electro-optic device comprising an electro-optic panel and a touch panel, wherein
the electro-optic panel includes:
a first electro-optic panel substrate;
a second electro-optic panel substrate arranged so as to face to the first electro-optic panel substrate; and
an electro-optic substance sandwiched between the first electro-optic panel substrate and the second electro-optic panel substrate, and
the touch panel includes:
a second touch panel substrate arranged on an opposite surface of the first electro-optic panel substrate with respect to the electro-optic substance, and having a second surface;
a first touch panel substrate arranged a fixed distance away from the second touch panel substrate via spacers, having a first surface that faces the second surface and having a flexibility, and the first touch panel substrate having an input surface;
a position detecting section formed on the first surface and arranged in a corner portion of the first surface, and detecting a position where the first touch panel substrate is being pressed based on changes in surface acoustic waves generated on the first surface;
a resin film formed directly on the second surface of the second touch panel substrate; and
a plurality of projections formed on a surface of the resin film, wherein
a recessed portion is formed on an opposite surface of the first touch panel substrate with respect to the second touch panel substrate, and
a first polarization plate is arranged on the recessed portion, and wherein
the first touch panel substrate is bent in a direction of the second touch panel substrate as a result of the input surface of the first touch panel substrate of the touch panel being pressed, and the bent portion of the first touch panel substrate comes into contact with the resin film provided on the second touch panel substrate.

2. The electro-optic device according to claim 1, further comprising
a second polarization plate arranged on an opposite surface of the second electro-optic panel substrate with respect to the electro-optic substance, wherein
the electro-optic panel is a liquid crystal panel, and the electro-optic substance is a liquid crystal layer.

3. The electro-optic device according to claim 1, wherein a Young's modulus of the resin film is less than a Young's modulus of the first touch panel substrate and the first polarization plate.

4. An electronic device comprising the electro-optic device according to claim 1.

5. An electro-optic device comprising an electro-optic panel and a touch panel, wherein
the electro-optic panel includes:
a first electro-optic panel substrate, having a second surface;
a second electro-optic panel substrate arranged so as to face to the first electro-optic panel substrate; and
an electro-optic substance sandwiched between the first electro-optic panel substrate and the second electro-optic panel substrate, and
the touch panel includes:
a touch panel substrate arranged a fixed distance away from the first electro-optic panel substrate via spacers, and having a first surface that faces the second surface and having a flexibility, and the touch panel substrate having an input surface;
a position detecting section formed on the first surface and arranged in a corner portion of the first surface, and detecting a position where the touch panel substrate is being pressed based on changes in surface acoustic waves generated on the first surface;
a resin film formed directly on the second surface of the first electro-optic panel substrate; and
a plurality of projections formed on a surface of the resin film, wherein
a recessed portion is formed on an opposite surface of the touch panel substrate with respect to the first electro-optic panel substrate, and
a first polarization plate is arranged on the recessed portion, and wherein
the touch panel substrate is bent in the direction of the first electro-optic panel substrate as a result of the input surface of the touch panel substrate being pressed, and the bent portion of the touch panel substrate comes into contact with the resin film provided on the first electro-optic panel substrate.

6. The electro-optic device according to claim 5, further comprising
a second polarization plate arranged on an opposite surface of the second electro-optic panel substrate with respect to the electro-optic substance, wherein
the electro-optic panel is a liquid crystal panel, and the electro-optic substance is a liquid crystal layer.

7. The electro-optic device according to claim 5, wherein a Young's modulus of the resin film is less than a Young's modulus of the first touch panel substrate and the first polarization plate.

8. An electronic device comprising the electro-optic device according to claim 5.

* * * * *